(12) United States Patent
Sakamoto

(10) Patent No.: US 6,504,272 B2
(45) Date of Patent: Jan. 7, 2003

(54) MULTI-PHASE ELECTRIC ROTATING MACHINE HAVING TOROIDAL COILS AND USING METHOD THEREOF

(75) Inventor: Masafumi Sakamoto, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 7 days.

(21) Appl. No.: 09/725,310

(22) Filed: Nov. 29, 2000

(65) Prior Publication Data

US 2001/0002095 A1 May 31, 2001

(30) Foreign Application Priority Data

Nov. 29, 1999 (JP) .......................................... 11-337409
Dec. 13, 1999 (JP) .......................................... 11-352806
Nov. 8, 2000 (JP) ...................................... 2000-340225
Nov. 24, 2000 (JP) ...................................... 2000-357351

(51) Int. Cl.$^7$ ............................................... H02K 37/00
(52) U.S. Cl. ...................... 310/49 R; 310/216; 310/261
(58) Field of Search .............................. 310/49 R, 254, 310/216, 261, 264, 265, 257, 156.49, 156.51, 156.53; 29/596–598

(56) References Cited

U.S. PATENT DOCUMENTS

| | | | |
|---|---|---|---|
| 3,599,069 A | 8/1971 | Welch | 318/696 |
| 4,206,374 A | 6/1980 | Goddijn | 310/49 R |
| 4,347,457 A | 8/1982 | Sakamoto | |
| 4,384,226 A | 5/1983 | Sato et al. | |
| 4,449,391 A | 5/1984 | Anthony | |
| 4,503,368 A | 3/1985 | Sakamoto | |
| 4,672,253 A | 6/1987 | Tajima et al. | 310/269 |
| 4,675,564 A | 6/1987 | Isozaki | |
| 4,764,697 A | 8/1988 | Christiaens | 310/49 R |
| 4,794,292 A * | 12/1988 | Torisawa | 310/257 |
| 4,983,867 A | 1/1991 | Sakamoto | |
| 5,032,747 A | 7/1991 | Sakamoto | |
| 5,128,570 A | 7/1992 | Isozaki | |
| 5,243,246 A | 9/1993 | Sakamoto | |
| 5,289,064 A | 2/1994 | Sakamoto | |
| 5,291,084 A * | 3/1994 | Shiotsuki et al. | 310/49 R |
| 5,321,340 A | 6/1994 | Tamaki et al. | 318/696 |
| 5,386,161 A | 1/1995 | Sakamoto | |
| 5,410,200 A | 4/1995 | Sakamoto et al. | |
| 5,780,944 A | 7/1998 | Sakamoto | |
| 5,854,526 A | 12/1998 | Sakamoto | |
| 5,874,495 A | 2/1999 | Robinson | |

(List continued on next page.)

OTHER PUBLICATIONS

U.S. patent application Ser. No. 09/238,917, filed Jan. 28, 1999, pending.
U.S. patent application Ser. No. 09/725,310, filed Nov. 29, 2000, pending.

*Primary Examiner*—Tran Nguyen
(74) *Attorney, Agent, or Firm*—Oblon, Spivak, McClelland, Maier & Neustadt, P.C.

(57) ABSTRACT

Disclosed is a multi-phase electric rotating machine having toroidal coils that consists of a stator having the number P of stator units (P is integer, P>2), a rotor facing the stator with a predetermined air gap. Each of stator units is formed of a pair of stator iron cores and a toroidal coil that concentrically gets caught therebetween. Each of the stator iron cores has the number Ns of stator teeth formed around an inner circumference at equal pitch Ps, the pair of stator iron cores are arranged such that the stator teeth are shifted by ½ of the pitch Ps. The stator units are arranged in the axial direction such that the stator teeth of the units are shifted by ½P of the pitch Ps. The rotor consists of rotor magnetic bodies and a permanent magnet. Rotor teeth of Nr in the total number are arranged around the outer circumference of the rotor. The rotor teeth consist of k pair of N and S polar rotor teeth groups (k is integer, k≧1) arranged in the rotating direction. Each of the rotor teeth groups consists of the number (Nr/2k) of rotor teeth that are continuously arranged in the rotating direction.

14 Claims, 10 Drawing Sheets

U.S. PATENT DOCUMENTS 6,060,800 A * 5/2000 Suzuki et al. ............. 310/49 R
6,153,953 A    11/2000 Isozaki et al.
6,160,330 A * 12/2000 Sakamoto ................. 310/49 R
6,172,438 B1   1/2001 Sakamoto

* cited by examiner

MULTI-PHASE ELECTRIC ROTATING MACHINE HAVING TOROIDAL COILS AND USING METHOD THEREOF

BACKGROUND OF THE INVENTION

1. Field of the Invention

The present invention relates to a multi-phase (referred to as a "P-phase" in this specification) electric rotating machine having toroidal coils such as a P-phase stepping motor having toroidal coils that is adequate for a driving motor of an ink-jet printer, a copier or the like.

2. Description of Prior Arts

Several types of stepping motors are known as prior arts in this kind of use. FIG. 13 is perspective view showing a claw pole permanent magnet type (referred to as a "PM-type" in the following description) stepping motor as a first prior art.

In FIG. 13, a stator S consists of a first stator unit 101 and a second stator unit 102 that make up a two-phase construction. The first stator unit 101 consists of comb-shaped shaped stator teeth 101a, 101b that arranged by turns along the inner circumference thereof, and a toroidal coil 101c that is housed in these stator teeth 101a, 101b. In the same manner, the second stator unit 102 consists of comb-shaped stator teeth 102a, 102b and a toroidal coil 102c that is housed in these stator teeth 102a, 102b.

Here, the stator teeth 101a and 102a are arranged with difference of 90 degrees in electric angle, for example.

The reference symbol R represents a rotor, which consists of a permanent magnet 103 whose outer circumference is magnetized such that N and S poles are alternatively arranged in the circumferential direction, a yoke 104 and a rotating shaft 105. The rotating shaft 105 is supported by the stator S through a bearing.

In this case, the angular pitch of the stator teeth in each stator unit of the stator S and the angular pitch of the N and S poles of the rotor R are determined to be coincident with each other.

Since the coils of the claw pole PM type stepping motor are formed by winding wires on bobbins, a time needed for winding wire is relatively short and connection wires can be easily attached, which can reduce the manufacturing cost. Therefore, this type of stepping motor is widely used in office automation equipment or the like.

FIG. 14 is a partially sectional perspective view showing a principal portion of a hybrid type (referred to as a "HB-type" in the following description) stepping motor as a second prior art.

In FIG. 14, the reference numeral 15 represents a rotating shaft, 17 represents a stator pole, 18 and 19 represent rotor teeth of a pair of rotor units.

Since the HB-type stepping motor allows the stator and the rotor to have a large number of pole teeth, step angle can be kept small, which gives advantages in positioning accuracy and in low-speed stability. Therefore, this type of stepping motor is also widely used in office automation equipment such as a printer or a copier.

In this construction, the coils of the stator are wound on the stator poles through slots formed at the inside portion of the stator, and therefore a two phase motor requires eight coils because the two-phase motor is provided with eight stator poles in general, as shown in FIG. 14.

The above described conventional constructions have problems as follows.

The PM-type stepping motor, which is the first prior art shown in FIG. 13, is produced at low !price because of the bobbin winding construction, while it is difficult to increase a number of magnetic poles because the stator teeth of the stator are formed as the claw poles (i.e., the comb teeth) that are meshed by turns and the rotor is magnetized. In general, the PM-type stepping motor whose motor diameter is about 40 mm has twenty-four magnetic poles, and resolution (i.e., step angle) of the two-phase motor is about 7.5 degrees.

Further, in the claw pole stator, since a magnetic flux is concentrated at the root of the claw pole, a magnetic flux density becomes saturated at the root of the claw pole, which produces a reduction of torque.

Still further, when the claw pole stator is adapted, since the stator teeth are meshed by turns, a leakage flux between the claw poles becomes larger.

On the other hand, the HB-type stepping motor, which is the second prior art shown in FIG. 14, has high resolution, while it has disadvantages that a time needed for winding wire is relatively long and a setting of connection wires is complex and expensive, because it is difficult to wind the stator coil wire through the narrow slot formed at the inside portion of the stator.

Further, though a magnetic flux generated from a permanent magnet of the rotor flows to the stator tooth faced thereto, the ratio of effective magnetic flux interlinkage with the coil is about 50%, which requires an expensive permanent magnet having a strong magnetic flux in order to keep adequate torque. This phenomenon will be described with reference to FIG. 15.

FIG. 15 is an enlarged view of the stator pole 17, the rotor tooth 18 that is S pole and the rotor tooth 19 that is N pole, which are shown in FIG. 14.

The rotor teeth 18 and 19 are arranged with difference of half-pitch.

A magnetic flux $\phi 1$ exited from the rotor tooth 18 is divided into a magnetic flux $\phi 2$ that returns to the adjacent rotor tooth 19 and a magnetic flux $\phi 3$ interlinkage with the coil. Since the returning magnetic flux $\phi 2$ is a half of the magnetic flux $\phi 1$, the effective magnetic flux $\phi 3$, which produces torque, becomes the remaining half of $\phi 1$.

It is therefore an object of the present invention to provide a P-phase electric rotating machine having toroidal coils that solves the foregoing problems and using method thereof.

SUMMARY OF THE INVENTION

In order to achieve the above object, a P-phase electric rotating machine having toroidal coils of the present invention is constructed as follows.

According to a first aspect of the present invention, provided is a P-phase electric rotating machine comprising: a stator including the number P of stator units (P is integer satisfying P≧2) each of which is formed of a pair of stator iron cores made from magnetic material and a toroidal coil that concentrically gets caught between the pair of stator iron cores, each of the stator iron cores being provided with the number Ns of stator teeth formed around an inner circumference at equal pitch Ps, the pair of stator iron cores of the each stator unit being arranged such that the stat br teeth are shifted to each other by ½ of the pitch Ps, and the number P of stator units being concentrically connected to be arranged in a direction of a rotating shaft such that the stator teeth of the stator units are shifted to one another by ½ P of the pitch Ps; and a rotor that faces the stator with a predetermined air gap and is rotatable, the rotor consisting of at least one rotor unit that has a permanent magnet and rotor teeth of Nr in the total number made from magnetic material arranged around the permanent magnet in the rotating direction of the rotor, the rotor teeth consisting of k pair of N (north) and S (south) polar rotor teeth groups (k is integer satisfying k≧1) arranged in the rotating direction, the each N polar rotor teeth group consisting of the number (Nr/2k) if rotor teeth that are continuously arranged in the rotating direction, and the each S polar rotor teeth group consisting of the number (Nr/2k) of rotor teeth that are continuously arranged in the rotating direction.

According to a second aspect of the present invention, in the P-phase electric rotating machine according to the first aspect of the present invention, the rotor comprises the number P of independent rotor units that correspond to and face the stator units, respectively.

According to a third aspect of the present invention, in the P-phase electric rotating machine according to the second aspect of the present invention, the number P of stator units are arranged such that the stator teeth of the stator units are coincident with one another instead of shifting, and the number P of rotor units are arranged such that the rotor teeth of the rotor units are shifted to one another by ½ P of the pitch Ps.

According to a fourth aspect of the present invention, provided is a P-phase electric rotating machine comprising: the number P of independent stator units (P is integer satisfying P≧2) each of which is formed of a pair of stator iron cores made from magnetic material and a toroidal coil that concentrically gets caught between the pair of stator iron cores, each of the stator iron cores being provided with the number Ns of stator teeth formed around an inner circumference at equal pitch Ps, the pair of stator iron cores of the each stator unit being arranged such that the stator teeth are shifted to each other by ½ of the pitch Ps, and the stator units being arranged in a direction of a rotating shaft; and the number P of independent rotor units that face the stator units with a predetermined air gap, respectively, and are rotatable, the rotor unit having a permanent magnet and rotor teeth of Nr in the total number made from magnetic material arranged around the permanent magnet in the rotating direction of the rotor, the rotor teeth consisting of k pair of N (north) and S (south) polar rotor teeth groups (k is integer satisfying k≧1) arranged in the rotating direction, the each N polar rotor teeth group consisting of the number (Nr/2k) of rotor teeth that are continuously arranged in the rotating direction, and the each S polar rotor teeth group consisting of the number (Nr/2k) of rotor teeth that are continuously arranged in the rotating direction, wherein when one phase of the toroidal coils of the stator units is excited and the corresponding rotor unit is attracted and aligned, the stator,teeth of the stator unit of the next phase is shifted from the rotor teeth of the corresponding rotor by ½ P of the pitch Ps.

According to a fifth aspect of the present invention, in the P-phase electric rotating machine according to one of the first through fourth aspects of the present invention, the stator teeth of the stator units overhang the inner circumference of the toroidal coils.

According to a sixth aspect of the present invention, in the P-phase electric rotating machine according to one of the first through fourth aspects of the present invention, the average center line of the N polar rotor teeth group forms $(360(n\pm\frac{1}{2})/Ns)$ degrees (n is integer satisfying n≧1) with respect to the average center line of the S polar rotor teeth group.

According to a seventh aspect of the present invention, in the P-phase electric rotating machine according to one of the first through fourth aspects of the present invention, Nr is smaller than Ns.

According to a eighth aspect of the present invention, in the P-phase electric rotating machine according to one of the first through fourth aspects of the present invention, P, k and Ns satisfy the conditions P=2, k=2 and Ns=4n±2.

According to a ninth aspect of the present invention, in the P-phase electric rotating machine according to one of the first through fourth aspects of the present invention, rotor magnetic bodies of the different polar rotor teeth groups are alternatively arranged around the rotor, and the boundaries among the different polar rotor teeth groups are connected to form a one-piece body at least when it is laminated.

It should be noted that a iron core of the rotor is referred to as the rotor magnetic body in this specification in order to distinguish the rotor elements from the stator elements.

According to a tenth aspect of the present invention, in the P-phase electric rotating machine according to one of the first through fourth aspects of the present invention, the stator unit is provided with a bobbin on which the toroidal coil is wound, and the bobbin gets caught between the pair of stator iron cores.

According to a eleventh aspect of the present invention, in the P-phase electric rotating machine according to one of the first through fourth aspects of the present invention, the stator teeth or the rotor teeth are formed as claw poles by die-cutting a magnetic steel plate.

According to a twelfth aspect of the present invention, in the P-phase electric rotating machine according to the eleventh aspect of the present invention, a yoke portion made from magnetic material is further provided, the yoke portion is closely connected with the outer circumference of the claw poles of the stator or the inner circumference of the claw poles of the rotor, and the yoke portion is independent from or integral with the stator or rotor.

According to a thirteenth aspect of the present invention, in the P-phase electric rotating machine according to one of the first through fourth aspects of the present invention, the rotor is arranged to surround the stator as an outer rotor construction, the stator teeth are formed around outer circumference instead of the inner circumference, and the rotor teeth are formed around inner circumference of the permanent magnet instead of the outer circumference.

According to a fourteenth aspect of the present invention, in the P-phase electric rotating machine according to one of the first through fourth aspects of the present invention, the motor is applied to an actuator to carry a printing head or to feed sheet in a printer.

DESCRIPTION OF THE ACCOMPANYING DRAWINGS

DESCRIPTION OF THE PREFERRED EMBODIMENTS

Figure 1:
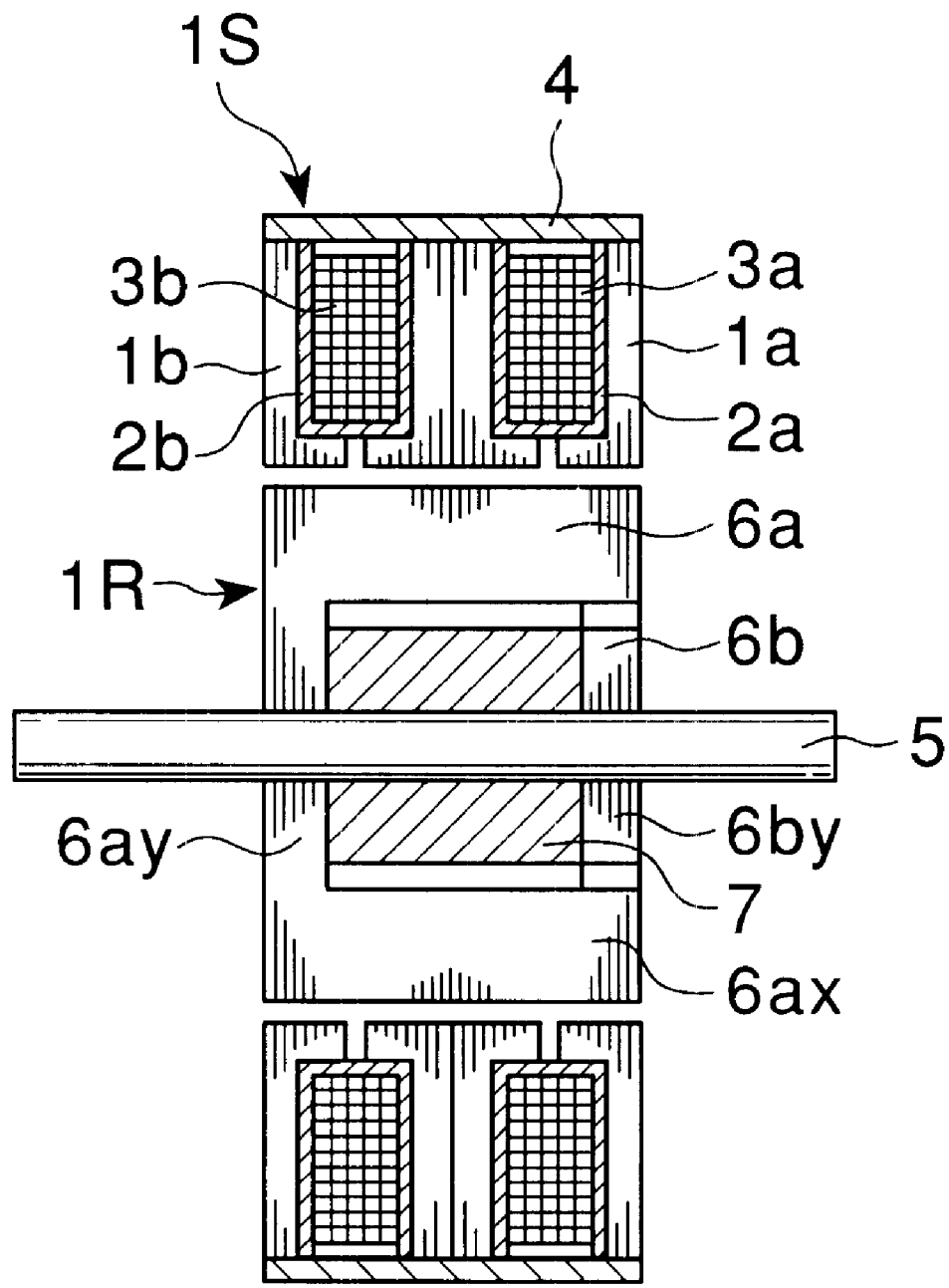
FIG. 1 is a vertically-sectioned side view of a two-phase stepping motor having toroidal coils according to a first embodiment.

Hereinafter, the present invention will be concretely described by explaining a stepping motor that is an embodiment of a P-phase electric rotating machine of the present invention shown in the drawings.

First Embodiment

Figure 2:
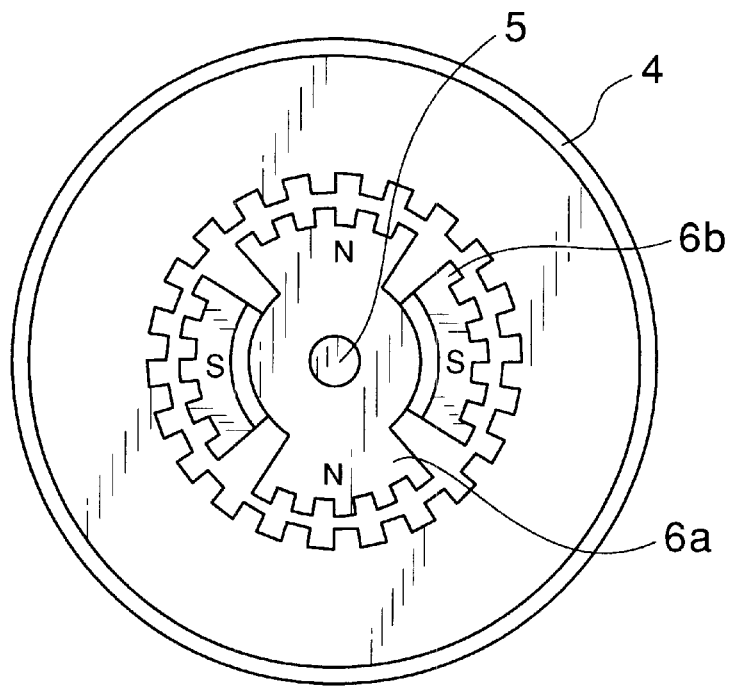
FIG. 2 is a front view of the stepping motor of FIG. 1 viewed from left-hand side.

FIG. 1 is a vertically-sectioned side view of a two-phase stepping motor having toroidal coils according to a first embodiment showing a basic construction thereof, and FIG. 2 is a front view when viewed from left-hand side. In each of the drawings, bearings, front and rear brackets are not shown.

Figure 3:
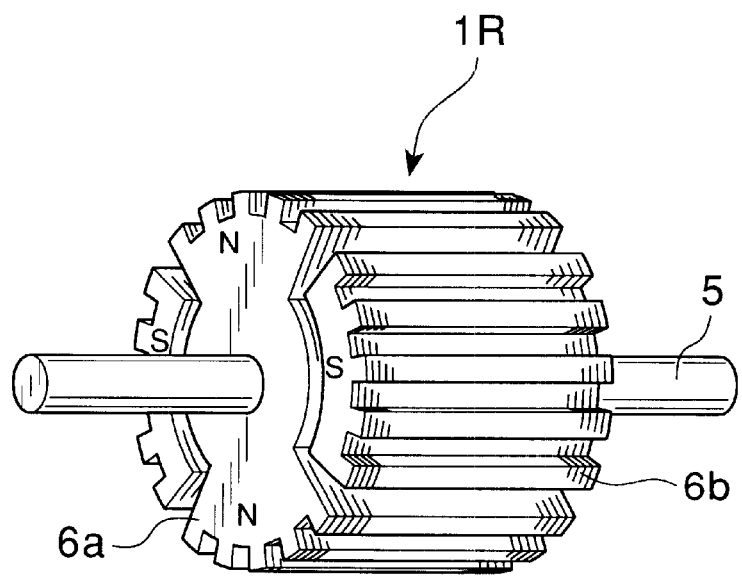
FIG. 3 is a perspective view of a rotor retrieved from the stepping motor of FIG. 1.

FIG. 3 is a perspective view of a rotor retrieved from the stepping motor.

The present embodiment includes the feature of P and K satisfy conditions P=2 and k=2.

In FIGS. 1 through 3, a ring-shaped stator unit 1a of a first phase of the two-phase stepping motor is connected with a ring-shaped stator unit 1b of a second phase in an axial direction to form a stator 1S. Each of the stator units 1a and 1b has a pair of stator iron cores formed from magnetic material, and particularly, the stator iron cores are formed by laminating silicon steel plates. Each of the stator iron cores is provided with the number Ns of stator teeth formed around an inner circumference thereof at equal pitch Ps, and the pair of stator iron cores are arranged such that the stator teeth are shifted to each other by ½ of the pitch Ps. Toroidal coils 3a and 3b that are wound on coil bobbins 2a and 2b formed from insulating material, and the bobbins 2a and 2b get caught between two pairs of stator iron cores, respectively.

Two stator units 1a and 1b are connected in a direction of a rotating shaft 5 such that the stator teeth of the stator units 1a and 1b are shifted to one another by ¼ of the pitch Ps. A yoke 4 surrounds the outer circumference of the stator 1S.

A rotor 1R is formed from magnetic material and is arranged within the center hole off the stator 1S. The rotor 1R faces the stator 1S with a predetermined air gap. A rotating shaft 5 is fixed at the center of the rotor 1R.

Since k=2 in this embodiment, the rotor 1R consists of a pair of U-shaped rotor magnetic bodies 6a, 6b and a permanent magnet 7 that is held between bottom portions 6ay, 6by of the rotor magnetic bodies 6a, 6b as shown in the section in the axial direction in FIG. 1. The rotor magnetic body 6a has the bottom portion 6ay and a pair of side arms (side walls) 6ax that are faced to each other at 180 degrees. The other rotor magnetic body 6b has the same shape. These rotor magnetic bodies 6a, 6b are arranged such that the bottom portions 6ay, 6by are located on opposite sides and the side arms of one rotor magnetic body are positioned at open sides of the other rotor magnetic body. That is, the rotor magnetic body 6a is at the position where the rotor magnetic body 6b is rotated by 90 degrees about the rotating shaft 5.

In the case of the construction of FIG. 1, as shown in FIG. 2, the permanent magnet 7 is fixed to the rotating shaft 5 and is magnetized in the axial direction. Since the U-shaped rotor magnetic bodies 6a, 6b are connected with the respective S and N pole surfaces of the permanent magnet 7 at the bottom portions, the rotor magnetic bodies 6a, 6b are magnetized as N pole and S pole, respectively.

Further, the rotor 1R has a plurality of rotor teeth at the outer circumferences of the side arms of the rotor magnetic bodies 6a and 6b as shown in FIGS. 2 and 3. The rotor teeth face the stator teeth of the stator 1S.

The rotor magnetic bodies 6a and 6b of the rotor 1R may be formed by laminating silicon steel plates or made from solid such as sintered steel. The method for laminating silicon steel plates will be described below.

As shown in FIGS. 2 and 3, the rotor teeth formed on the outer circumferences of the rotor magnetic bodies 6a and 6b consist of a first N (north) polar rotor teeth group, a first S (south) polar rotor teeth group, a Second N polar rotor teeth group and a second S polar rotor teeth group that are arranged in the rotating direction of the rotor 1R.

When the adjacent N and S polar rotor teeth groups are counted as one pair, there are two pairs of rotor teeth group in the first embodiment, which results k=2.

In the case of k=4, each of rotor magnetic bodies should have four side arms extended from the bottom portion at every 90 degrees, and the rotor magnetic bodies should be fixed to the rotating shaft 5 with difference of 45 degrees. The bottom portions of the rotor magnetic bodies should connect the permanent magnet 7 from the opposite pole sides. In such a case, the four pairs of N and S polar teeth groups are arranged around the outer circumference of the rotor in the rotating direction.

Figure 16:
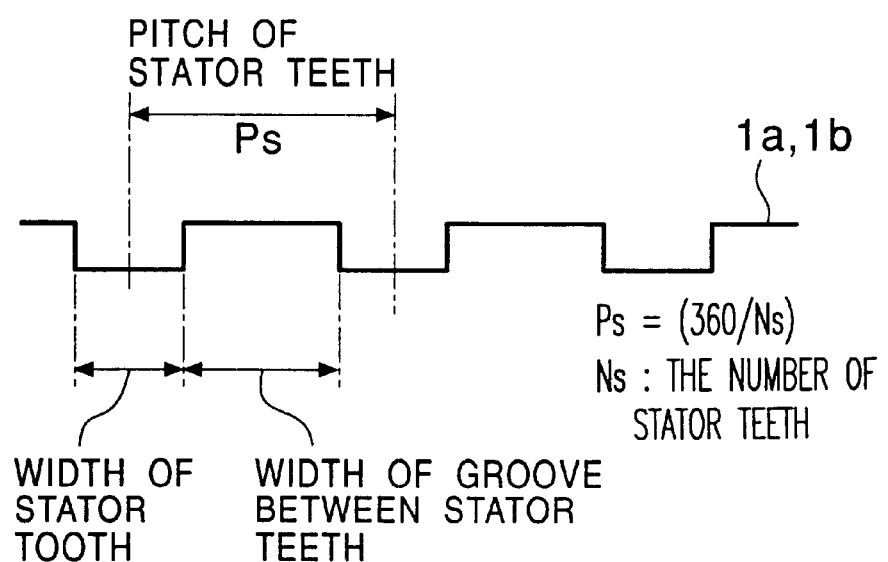
FIG. 16 is a development of the stator teeth for explaining a relationship among a pitch of stator teeth, a width of a stator tooth and a width of groove between stator teeth.

Thus, the rotor of the present invention can be constructed by k pair of N and S polar rotor teeth groups, in general. Therefore, assuming that the total number of rotor teeth equals Nr and the number k of side arms are formed on the respective rotor magnetic bodies 6a and 6b, the number (Nr/2k) of rotor teeth are formed on the respective side arm because a pair of rotor magnetic bodies are utilized. These technical contents are summarized and described in the claimed invention, which covers the case where the number P of stator units face the single rotor. A relationship among a pitch of stator teeth, a width of a stator tooth and a width of groove between stator teeth is shown in FIG. 16. Further, FIG. 2 shows a case where Ns=22 and Nr=20.

A conventional HB-type stepping motor only uses 50% of the magnetic flux generated from a permanent magnet of the rotor as described, while the construction of this embodiment has a revolutionary advantage that most of the magnetic flux generated from the rotor can be used as effective magnetic flux interlinkage with the coil, which enables to achieve high torque.

That reason can be understood from FIG. 1 that shows the stator unit in the vertically-sectioned side view.

Namely, since each pair of stator iron cores of the stator units 1a and 2b are separated at the center in the axial direction where the cores face the rotor 1R, the magnetic flux does not establish a short.

Second Embodiment

Figure 4:
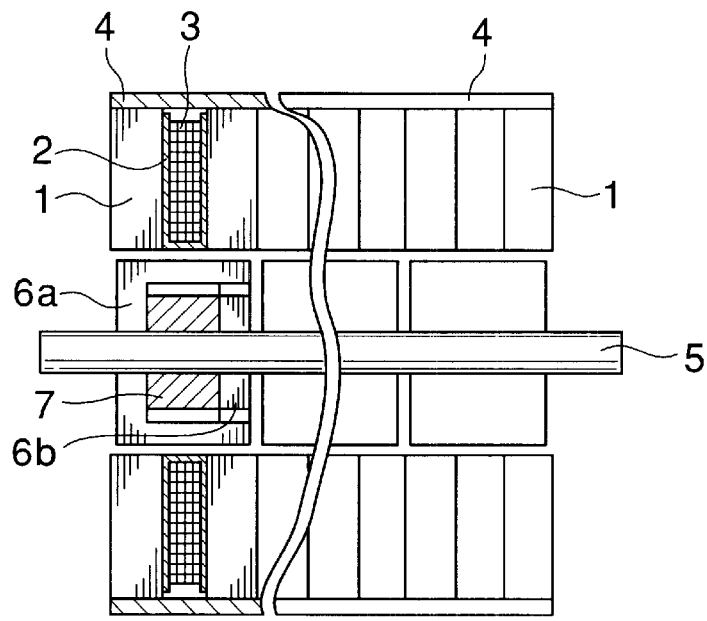
FIG. 4 is a vertically-sectioned side view of a P-phase stepping motor having toroidal coils according to a second embodiment.

FIG. 4 is a vertically-sectioned side view of a principal portion of a second embodiment according to the present invention.

In the first embodiment shown in FIGS. 1 through 3, the number P of stator units face the single rotor as described above.

While this, a motor of the second embodiment is constructed such that the number P of stator units face the number P of rotor units, respectively, as shown in FIG. 4. This construction is rather complex, however, it exhibits good performance because the rotor is resistant to magnetic saturation.

Further, since FIG. 4 is simplified not to distinguish the reference symbols for the number n of components, and the stator unit and the rotor unit at the left end are only shown as sections.

That is, in FIG. 4, the reference numeral 1 represents the stator unit that consists of a pair of stator iron cores, 2 represents a coil bobbin, 3 represents a coil, 4 represents a yoke, 5 represents a rotating shaft, 6a and 6b represent rotator magnetic bodies, and 7 represents a permanent magnet.

Third Embodiment

Figure 5:
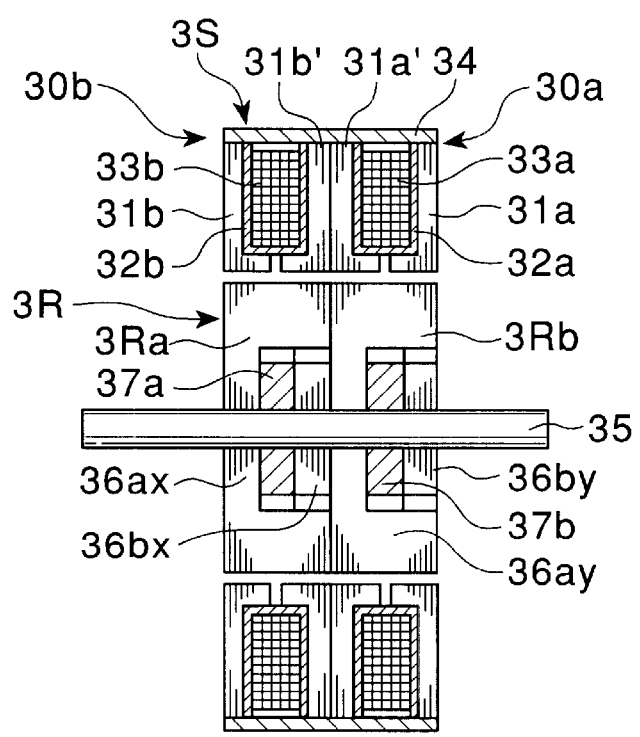
FIG. 5 is a vertically-sectioned side view of a P-phase stepping motor having toroidal coils according to a third embodiment.

FIG. 5 is a vertically-sectioned side view of a third embodiment according to the present invention. The illustrated example satisfies conditions P=2 and k=2.

The second embodiment includes a plurality of rotor units that are arranged so that the rotor, teeth are coincident with one another without shifting, while the characteristic of this embodiment is that two rotor units are connected such that the rotor teeth are shifted to each other by ½P of the pitch Ps of the stator teeth. In this embodiment, since P equals 2, the shift equals ¼ of the pitch PS.

In this manner, stator units that forms a stator 3S are arranged such that the stator teeth of the stator units are coincident with each other without shifting, which is different from the first and second embodiments, and the arrangement of the rotor units that form a rotor 3R is also different from the second embodiment. Therefore, portions of the stator and the rotor in FIG. 5 are indicated by double-digit numbers that are different from the first and second embodiments.

In FIG. 5, a stator unit 30a of a first phase of the two-phase stepping motor is connected with a stator unit 30b of a second phase in an axial direction to form a stator 3S. The stator units 30a and 30b have two pairs of stator iron cores 31a, 31a'; 31b, 31b' formed from magnetic material, respectively, and particularly, the stator iron cores are formed by laminating silicon steel plates. Each of the stator iron cores 31a, 31a'; 31b, 31b' is provided with the number Ns of stator teeth formed around an inner circumference thereof at equal pitch Ps, and each pair of stator iron cores 31a, 31a'; 31b, 31b', are arranged such that the stator teeth are shifted to each other by ½ of the pitch Ps. Toroidal coils 33a and 33b that are wound on coil bobbins 32a and 32b formed from insulating material, and the bobbins 32a and 32b get caught between two pairs of stator iron cores, respectively.

Two stator units 30a and 30b are connected in the axial direction such that the stator teeth of the stator units 30a and 30b are coincident to each other. A yoke 34 surrounds the outer circumference of the stator units 30a, 30b.

The rotor 3R is arranged within the center hole of the stator 3S. The rotor 3R faces the stator 3S with a predetermined air gap.

The rotor 3R consists of a pair of rotor units 3Ra, 3Rb and a rotating shaft 35. The rotor unit 3Ra consists of a pair of rotor magnetic bodies 36ax, 36bx and a permanent magnet 37a, and the rotor unit 3Rb consists of a pair of rotor magnetic bodies 36ay, 36by and a permanent magnet 37b. In FIG. 5, bearings, front and rear brackets are not shown because these are not principal components.

Since k equals 2 in FIG. 5, the rotor magnetic bodies 36ax, 36bx have U-shaped constructions. That is, the rotor magnetic body 36ax has the bottom portion and a pair of side arms that are faced to each other at 180 degrees. The other rotor magnetic body 36bx has the same shape. The rotor unit 3Ra has a plurality of rotor teeth at the outer circumferences of the side arms of the rotor magnetic bodies 36ax and 36bx. The rotor teeth of the rotor unit 3Ra face the stator teeth of the stator unit 30b. In the same manner, the rotor teeth of the rotor unit 3Rb face the stator teeth of the stator unit 30a.

The permanent magnets 37a and 37b shown in FIG. 5 are magnetized in the axial direction. Since the U-shaped rotor magnetic bodies 36ax, 36bx; 36ay, 36by are connected with the respective S and N pole surfaces of the permanent magnets 37a and 37b at the bottom portions, the rotor magnetic bodies 36ax, 36bx; 36ay, 36by are magnetized as N pole and S pole, respectively. In this case, the condition of the magnetizing of each of the rotor units 3Ra and 3Rb is the same as the rotor 1R shown in FIG. 2. Therefore, the rotor teeth formed on the outer circumference of each of the rotor units 3Ra and 3Rb consists of a first N polar rotor teeth group, a first S polar rotor teeth group, a second N polar rotor teeth group and a second S polar rotor teeth group that are arranged in the rotating direction.

When the adjacent N and S polar rotor teeth groups are counted as one pair, there are two pairs of rotor teeth groups in the third embodiment, which results k=2.

In the case of k=4, each of rotor magnetic bodies should have four side arms extended from the bottom portion at every 90 degrees, and the rotor magnetic, bodies should be fixed to the rotating shaft 35 with difference of 45 degrees. The bottom portions of the rotor magnetic bodies should connect the permanent magnets 37a and 37b from the opposite pole sides. In such a case, when the N and S polar rotor teeth groups are counted as one pair, the four pairs of N and S polar teeth groups are arranged around the outer circumference of the rotor in the rotating direction.

Thus, the rotor of the present invention can be constructed by k pair of N and S polar rotor teeth groups, in general. Therefore, assuming that the total number of rotor teeth equals Nr and the number k of side arms are formed on the respective rotor magnetic bodies 36ax, 36bx; 36ay, 36by, the number (Nr/2k) of rotor teeth are formed on the respective side arm because a pair of rotor magnetic bodies are utilized for one rotor unit.

Incidentally, in the case of FIG. 5, the motor is a two-phase motor satisfying a condition P=2 and the rotor 3R includes the two rotor units 3Ra, 3Rb, the respective rotor magnetic bodies 36ax, 36bx; 36ay, 36by are shifted with one another by 360/(4 Ns) degrees in mechanical angle.

Further, this idea can be expanded as follows. When the first phase toroidal coil 33a is excited and the rotor teeth of the rotor unit 3Rb are attracted by the stator teeth of the stator unit 30a and the rotor unit 3Ra remains stationary (is aligned), the stator teeth of the stator unit 30b of the next phase should be shifted from the rotor teeth of the corresponding rotor unit 3Ra by 360/4 Ns degrees in mechanical angle (½P of the pitch Ps). When such a condition is satisfied, the phase difference between the stator units or the phase difference between the rotor units is not required to satisfy the condition described in the second or third embodiments.

However, the condition of the presently described embodiment is somewhat complex, and the conditions of the second and third embodiments have larger practicality.

Further the rotor magnetic bodies of the rotor 3R of this embodiment may be formed by laminating silicon steel plates or made from solid such as sintered steel. Additionally, since the rotor teeth of the magnetic bodies do not mesh with each other, the resolution can be higher than a conventional PM-type claw pole motor and the magnetic flux density can be reduced, even if the rotor teeth are formed as claw poles by die-cutting a magnetic steel plate.

The first and second embodiments are common in the basic design, while the specific design concerning the constructions of the stator iron cores is different as follows.

Namely, the stator teeth of the stator iron cores of FIG. 1 overhang the inner circumference of the toroidal coils. On the other hand, the stator teeth of the stator iron cores of FIG. 4 do not overhang the inner circumference of the toroidal coils.

Both of the construction operate without problems, while the construction of FIG. 1 has an advantage of high torque because facing area size between the rotator teeth and the stator teeth becomes larger. Therefore, it is preferable that the stators of the second and third embodiments adopt the overhang construction as with the first embodiment.

In the first through third embodiments, the pitch of the number Ns of the stator teeth equally arranged around the inner circumference of the stator unit equals (360/Ns) degrees.

When the pitch of the rotor teeth of the same polar rotor teeth group formed on the outer surface of the side arm of the rotor magnetic bodies 6a and 6b equals (360/Ns) degrees, the torque becomes higher. However, in the same time, cogging torque that is torque when the coils are not exited also becomes large, which may cause problems of a vibration and a noise.

In order to avoid the problem, the pitch of the rotor teeth of the same polar rotor teeth group may be selected from the range of ((360/Ns)±(360/Ns) ) degrees such that the value is not equal to (360/Ns) degrees.

In this case, however, the average center line of the N polar rotor teeth group should form (360(n±½)/Ns) degrees (n is integer satisfying n≧1) with respect to the average center line of the S polar rotor teeth group when the stator teeth of the pair of the stator iron cores are shifted by ½ of the pitch Ps. This technical content is described in claim 6.

As is evident from FIG. 3, when the pitch of the stator teeth is equal to the pitch of the rotor teeth on the side arm, since the rotor teeth cannot be formed at the boundaries of the side arms, the total number Nr of the rotor teeth is smaller than or equal to (Ns−k), where Ns is the total number of the stator teeth and k is the number of side arms of the rotor.

The best mode of the present invention is a two-phase motor satisfying a condition P=2.

Further, when k=2, the magnetic field is well balanced and the construction is simple.

Because, when k=1, since the different polar rotor teeth groups are located at the different positions by 180 degrees, attracting force in the radial direction cannot be canceled, which generating force couple, causing a vibration and a noise. Assuming that the motor satisfies conditions P=2 and k=2, the equation 360(n±½)/Ns=90 holds when the side arms of the rotor magnetic bodies are equally arranged. This results Ns=4n±2.

For example, n=12 results Ns=50, a step angle of a two-phase stepping motor equals 1.8 degrees.

According to the present invention, since the number of the stator teeth can be freely selected, there is a high flexibility in the step angle as compared with a conventional HB-type stepping motor.

Fourth and Fifth Embodiments

In the above embodiments, while the permanent magnet of the rotor is magnetized in the axial direction, the magnetizing direction is not limited in the axial direction in order to keep the alternative arrangement of the different polar rotor teeth groups in the rotating direction of the rotor.

Figure 6:
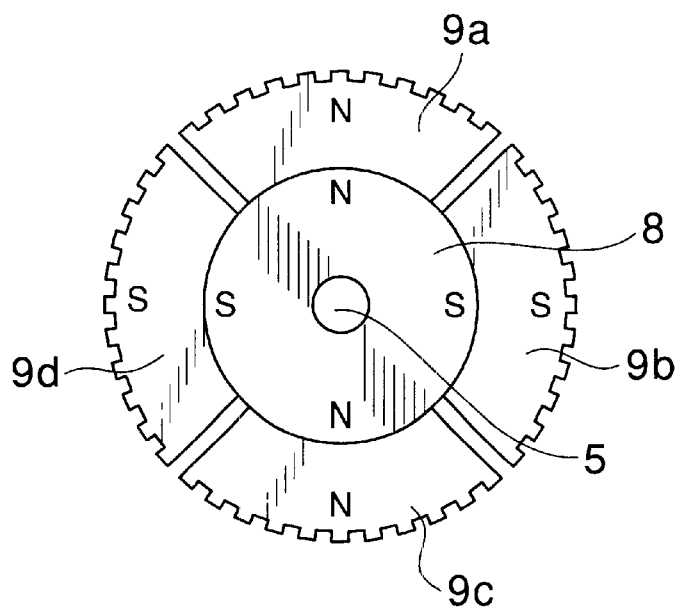
FIG. 6 is a front view showing a rotor of a P-phase stepping motor having toroidal coils according to a fourth embodiment.
Figure 7:
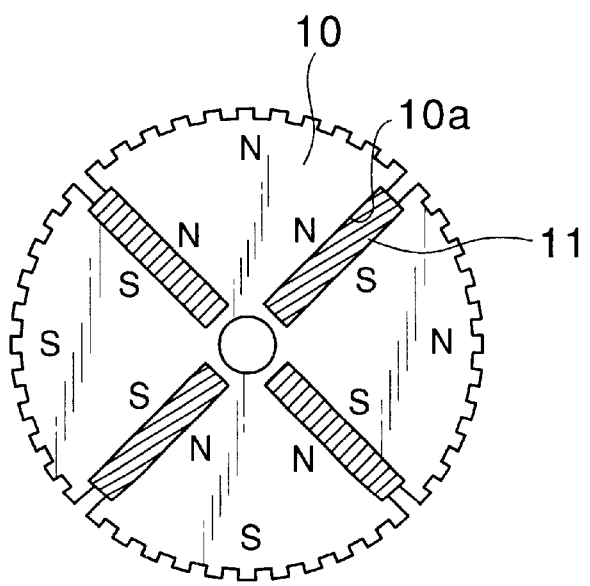
FIG. 7 is a front view showing a rotor of a P-phase stepping motor having toroidal coils according to a fifth embodiment.

FIGS. 6 and 7 are front views viewed in the axial direction that show rotors of fourth and fifth embodiments, respectively.

In the fourth embodiment shown in FIG. 6, four independent rotator arms 9a through 9d are attached around an outer circumference of a cylindrical permanent magnet 8, and the rotor arms 9a through 9d are alternatively magnetized as N and S poles.

In the fifth embodiment shown in FIG. 7, four slits 10a are formed in a rotor 10, and four permanent magnets 11 are inserted into the slits 10, respectively. The rotor 10 can operate when the permanent magnets 11 are set as shown in FIG. 7.

Further, while the different polar rotor arms are connected with one another at the outer portions in the embodiments of FIGS. 6 and 7, short of the magnetic flux becomes insignificant because the connected portions are slender. As a matter of course, the rotors of the first embodiment are not limited in the construction shown in FIGS. 2 and 3, the different polar rotor arms may be connected with one another at the outer portions.

Figure 8:
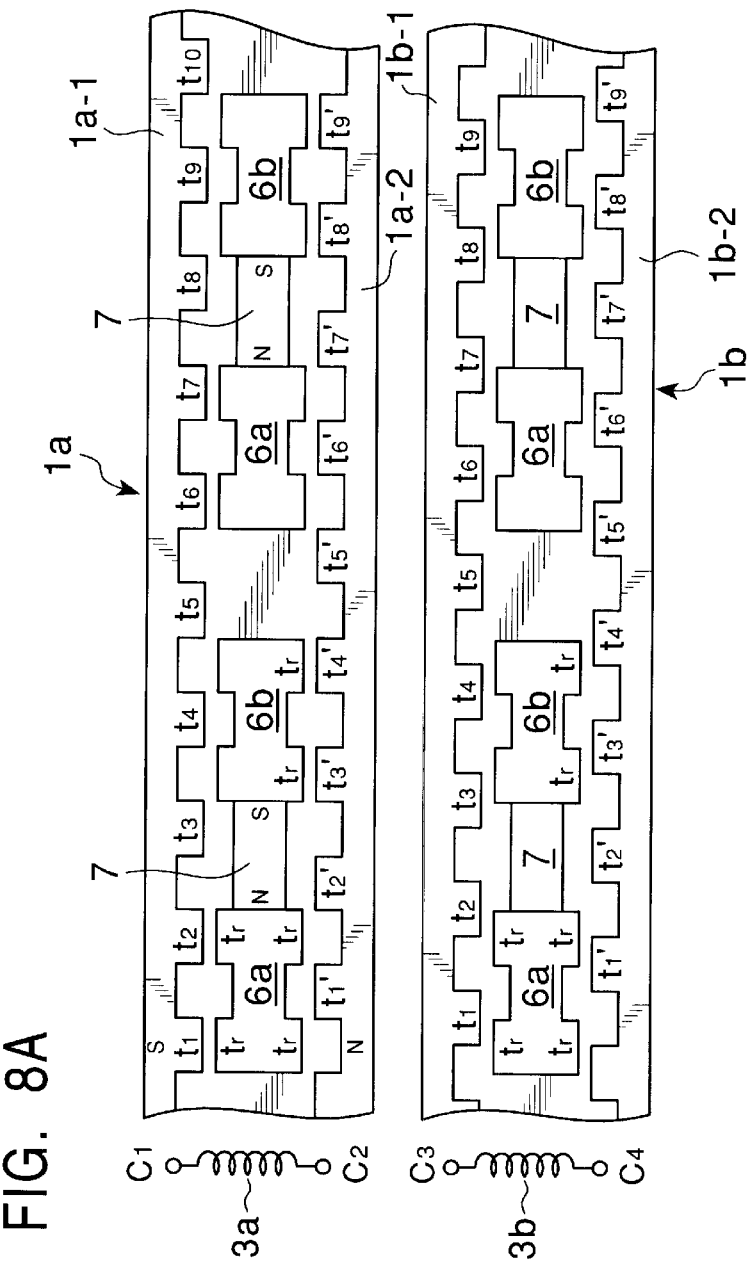
FIG. 8A is a development of the stator and the rotor for explaining the operating principle,of the two-phase stepping motor having toroidal coils according to the present invention.
FIG. 8B is a sequential chart for explaining the operating principle of the two-phase stepping motor having toroidal coils according to the present invention.

FIGS. 8A and 8B are explanatory drawings for explaining the operating principle of the two-phase stepping motor, FIG. 8A is a schematic development for showing positional relationship between the stator teeth and the rotor teeth, and FIG. 8B is a sequential chart for a step operation.

FIG. 8A is predicated on the two-phase motor that satisfy the conditions k=2, n=2, and Ns=4n±2=10. In FIG. 8A, the width of the stator tooth and the width of the grooves between the stator teeth are shown such that they are equal to each other.

In FIG. 8A, the reference symbol 1a represents the stator unit of phase A (a first phase), 1b represents the stator unit of phase B (a second phase), 1a-1 represents one of two stator iron cores of the stator unit of phase A, 1a-2 represents the other stator iron core. The stator iron cores 1a-1 and 1a-2 are provided with ten stator teeth $t_1$ through $t_{10}$ and ten stator teeth $t_1'$ through $t_{10}'$, respectively ($t_{10}'$ is not shown). The two stator iron cores 1a-1 and 1a-2, face each other such that the stator teeth of both of the cores are shifted by ½ of the pitch Ps with each other. These stator iron cores 1a-1, 1a-2 and the toroidal coil 3a that gets caught therebetween constitute the stator unit 1a of phase A shown in FIG. 1. The other stator unit 1*b* of phase B is ai so composed of the stator iron cores 1*b*-1, 1*b*-2 each of which has ten stator teeth and the toroidal coil 3*b* that gets caught therebetween.

The stator units 1*a* and 1*b* are connected to form the stator 1S of FIG. 1 such that the stator unit 1*b* of phase B is shifted by ¼ of the pitch Ps in the rotating direction with respect to the stator unit 1*a* of phase A. The rotor 1R is arranged within the stator 1S with the predetermined air gap.

This rotor 1R consists of the rotor magnetic body 6*a* that is provided with two rotor teeth groups each of which has a plurality of rotor teeth (while five teeth as shown in FIGS. 2 and 3, two teeth are indicated in FIG. 8A for brevity), the rotor magnetic body 6*b* that has the same shape but is opposite in the axial direction as the rotor magnetic body 6*a* and is shifted in phase by 180 degrees in electric angle with respect to the rotor magnetic body 6*a*, the permanent magnet 7 that is magnetized in the axial directions. The permanent magnet 7 contacts with the bottom portions 6*ay* and 6*by* of the rotor magnetic bodies 6*a* and 6*b*, and the rotor magnetic bodies 6*a*, 6*b* and the permanent magnet 7 are connected by the rotating shaft 5.

Further, since the rotor magnetic body 6*a* satisfies a condition k=2, the rotor magnetic body 6*a* has two side arms on which the rotor teeth are formed. The side arms face each other at 180 degrees in mechanical angle. The rotor magnetic body 6*b* also has two side arms that face each other at 180 degrees in mechanical angle.

Assuming that terminals of the toroidal coils 3*a* and 3*b* are represented by reference symbols C1, C2, C3 and C4, the motor operates as a stepping motor when the toroidal coils are excited according to operation sequence shown in FIG. 8B.

In step 1 of FIG. 8B, the toroidal coil 3*a* is excited by applying a positive voltage (+) to the terminal C1 and a negative voltage (−) to the terminal C2, and power is not applied to the terminals C3, C4 of the toroidal coil 3*b*. FIG. 8A shows the condition at the step 1. Namely, the stator iron core 1*a*-1 of the stator unit 1*a* of phase A is magnetized as S pole and the stator iron core 1*a*-2 is magnetized as N pole. Therefore, the stator teeth $t_1$, $t_2$ (S pole) of the stator iron core 1*a*-1 and the rotor teeth tr (N pole) of the rotor magnetic body 6*a* that contacts the N pole of the permanent magnet 7 are attracted to each other; and the stator teeth $t_3'$, $t_4'$ (N pole) of the stator iron core 1*a*-2 and the rotor teeth tr (S pole) of the rotor magnetic body 6*b* that contacts the S pole of the permanent magnet 7 are attracted to each other. As a result, the rotor 1R keeps the position shown in FIG. 8A.

While the above description only touches on the stator teeth $t_1$ through $t_5$ that are the left-half of the stator iron core 6*a*, the attracting force also generates between the stator teeth $t_6$ through $t_{10}$ of the right-half of the stator iron core 6*a* and the rotor teeth of the rotor 1R in the same manner.

In the step 2, power is not applied to the terminals C1, C2, and a positive voltage (+) is applied to the terminal C3 and a negative voltage (−) is applied to the terminal C4. In this step, the stator unit 1*a* of phase A is not magnetized, the stator iron core 1*b*-1 of the stator unit 1*b* of phase B is magnetized as S pole and the stator iron core 1*b*-2 is magnetized as N pole. Therefore, the stator teeth $t_1$, $t_2$ (S pole) of the stator iron core 1*b*-1 and the rotor teeth tr (N pole) of the rotor magnetic body 6*a* that contacts the N pole of the permanent magnet 7 are attracted to each other; and the stator teeth $t_3'$, $t_4'$ (N pole) of the stator iron core 1*b*-2 and the rotor teeth tr (S pole) of the rotor magnetic body 6*b* that contacts the S pole of the permanent magnet 7 are attracted to each other. As a result, the rotor 1R moves in the right direction by ¼ of the pitch Ps from the position shown in FIG. 8A, and then stops when the attracted teeth face each other. The ¼ of the pitch Ps, which is moving amount of the rotor 1R, equals a step angle of this stepping motor.

In the step 2, since the rotor teeth tr of the rotor magnetic body 6*a*, which faces the rotor unit 1*a* of phase A, have moved in the right direction by ¼ pitch from the stator teeth $t_1'$, $t_2'$ of the stator iron core 1*a*-2, the rotor teeth tr overlap with the stator teeth $t_1'$, $t_2'$ by half.

In the step 3, power is not applied to the terminals C3, C4, and a negative voltage (−) is applied to the terminal C1 and a positive voltage (+) is applied to the terminal C2. In this step, the stator iron core 1*a*-2 is magnetized as S pole and the stator iron core 1*a*-1 is magnetized as N pole. Therefore, the stator teeth $t_1'$, $t_2'$ (S pole) of the stator iron core 1*a*-2 and the rotor teeth tr (N pole) of the rotor magnetic body 6*a* are attracted to each other, and the stator teeth $t_4$, $t_5$ (N pole) of the stator iron core 1*a*-1 and the rotor teeth tr (S pole) of the rotor magnetic body 6*b* are attracted to each other. As a result, the rotor 1R moves in the right direction by ¼ of the pitch Ps from the position of the step 2.

In the step 4, power is not applied to the terminals C1, C2, and a negative voltage (−) is applied to the terminal C3 and a positive voltage (+) is applied to the terminal C4. As a result, the rotor 1R moves in the right direction by ¼ of the pitch Ps of the stator teeth from the position of the step 3, in the same manner.

Thus, a step angle of this stepping motor equals ¼ of the pitch Ps of the stator teeth. Further, while the above description only touches to the condition where the width of the stator tooth and the width of the groove between the stator teeth are equal to each other, the present invention holds even if the width of the stator tooth is smaller than the width of the groove between the stator teeth. In any case, the step angle of the P-phase stepping motor becomes ½P of the pitch Ps of the stator teeth.

While the step angle of the conventional P-phase stepping motor is ½P of the pitch of the rotor teeth, the step angle of the P-phase stepping motor of the present invention is ½P of the pitch Ps of the stator teeth as shown in FIG. 8A. This is the significant difference between the conventional motor and the present invention.

Next, the laminating method for forming the rotor magnetic bodies 6*a*, 6*b* is described with reference to FIGS. 9 and 10.

Figure 9:
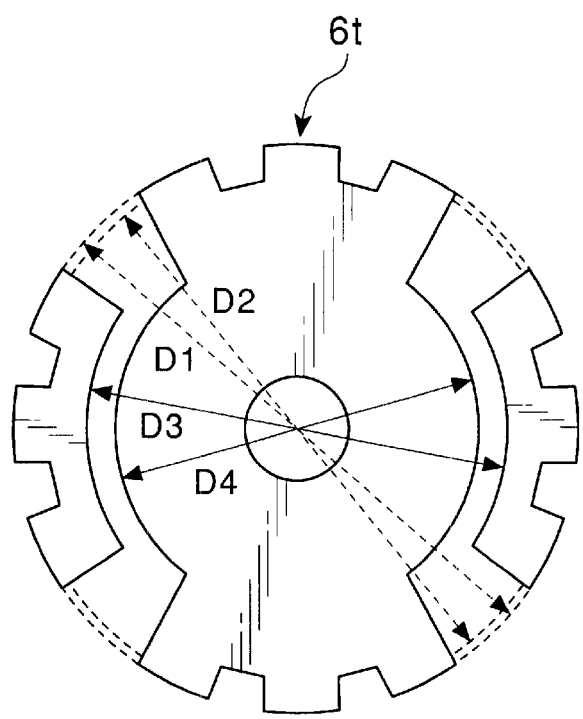
FIG. 9 is a plan view of a stamped first silicon steel plate that constitutes a rotor magnetic body by a laminating method.
Figure 10:
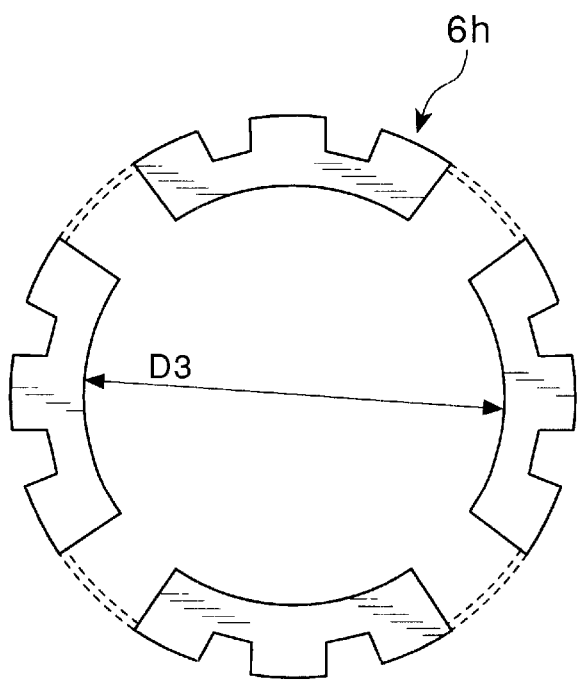
FIG. 10 is a plan of a stamped second silicon steel plate that constitutes the rotor magnet body by the laminating method.

FIGS. 9 and 10 show stamped silicon steel plates that constitute the rotor magnetic bodies by laminating. FIG. 9 shows a fist silicon steel plate 6*t* that forms the bottom portion of one rotor magnetic body and the side arms of the other rotor magnetic body. FIG. 10 shows a second silicon steel plate 6*h* that forms the side arms of both of the rotor magnetic bodies. After the stamping process, three: areas illustrated by solid lines of the first silicon steel plate 6*t* are connected through bridge portions illustrated by dotted lines. In the same manner, four areas illustrated by solid lines of the second silicon steel plate 6*h* are connected through bridge portions illustrated by dotted line. Namely, the every silicon steel plate is a one-piece plate.

At first, a predetermined number of the first silicon steel plates 6*t* are laminated to form the bottom portion 6*ay* of the rotor magnetic body 6*a* and the tip ends of the side arms of the rotor magnetic body 6*b*. And then, the permanent magnet 7 is set on the bottom portion 6*ay*.

Next, a predetermined number of the second silicon steel plates 6*h* are laminated on the first silicon steel plates that have been already laminated. In this process, the four side arms are formed.

After that, a predetermined number of the first silicon steel plates 6*t* are further laminated in the orientation that is different from the orientation of the first silicon steel plates 6t forming the bottom portion 6ay by 90 degrees. In this process, the bottom portion 6by of the rotor magnetic body 6b and the tip ends of the side arms of the rotor magnetic body 6a are formed.

Then, the laminated silicon steel plates 6t, 6h are molded by resin with the permanent magnet 7.

Finally, the outer surfaces of the molded rotor magnetic bodies 6a, 6b are cut away. In FIG. 9, the reference symbol D1 represents an outside diameter after stamping process and D2 represents an outside diameter after cutting. The bridge portions illustrated by the dotted lines are cut away by the cutting process.

Further, the bridge portions may be preserved when the rotor is assembled in the stator. The bridge portions are so narrow that magnetic flux is saturated, which has little effect on the performance of the motor.

The permanent magnet 7 contacts with a circular area whose outside diameter is D4. The second silicon steel plate 6h of FIG. 10 can be formed by further stamping the plate 6t of FIG. 9 with a cylindrical punch whose outside diameter is D3.

Figure 13:
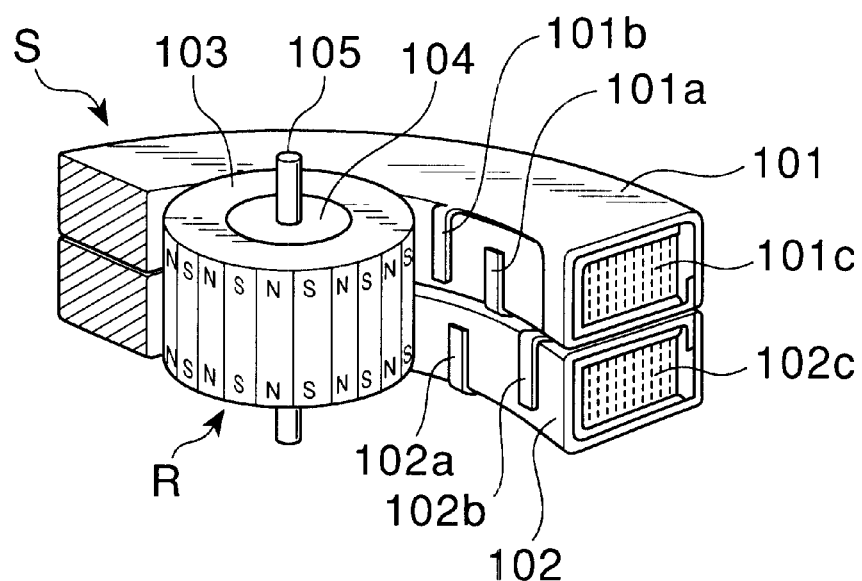
FIG. 13 is a perspective view of a stepping motor of the first prior art.

When the rotor FIGS. 1 and 3 is combined with a conventional claw pole stator, which is shown in FIG. 13 for example, an operational stepping motor can be obtained. Since the resolution (step angle) is determined by the number of claw poles for one phase of the stator, the resolution is much the same as a conventional PM-type stepping motor. However since the rotor is the HB-type, torque is larger than the PM-type motor.

Figure 11:
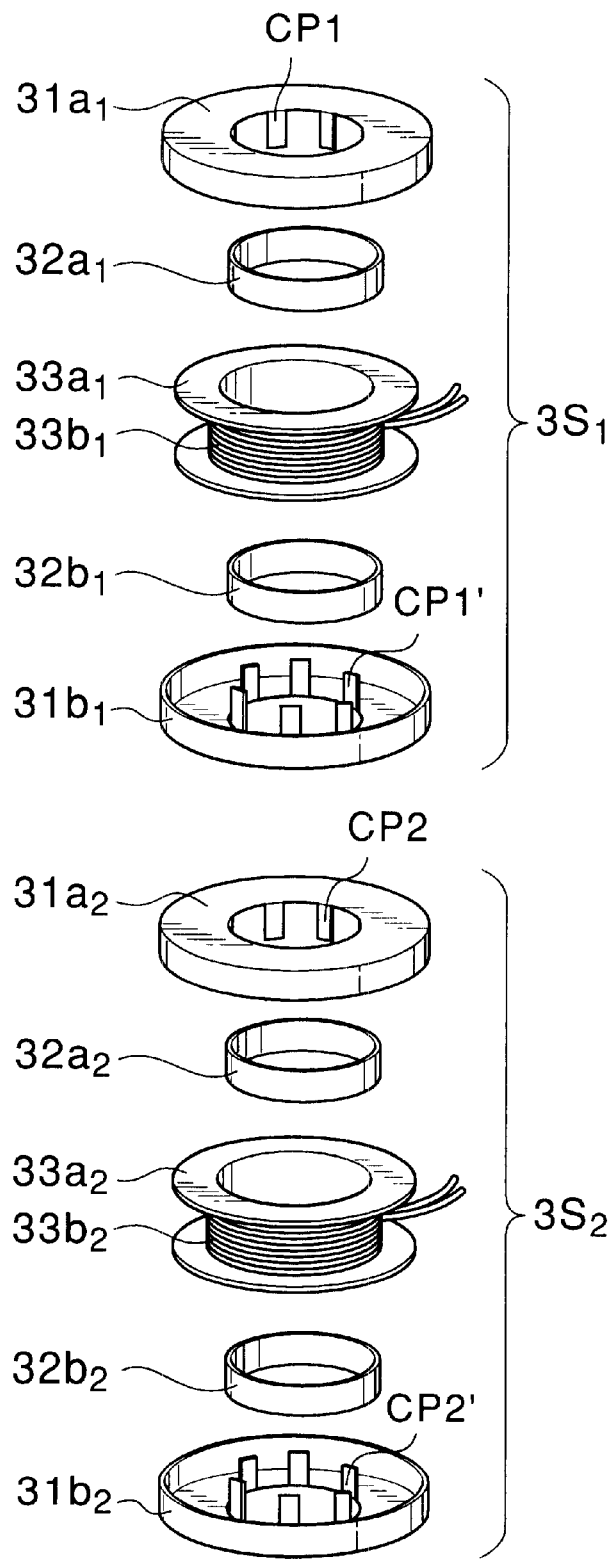
FIG. 11 is an exploded perspective view showing the entire costruction of the improved claw pole type stator on which a magnetic ring is arranged.

A construction of the improved claw pole type stator having the above described overhanging construction is shown in FIG. 11. FIG. 11 is an exploded perspective view showing the entire construction of the stator that is formed of the improved claw poles. In the description of FIG. 11, stator teeth are referred to as claw poles.

In FIG. 11, the reference symbols $3S_1$ and $3S_2$ represent stator units of first and second phases that correspond to the stator units 30a and 30b shown in FIG. 5.

The stator unit $3S_1$ of the first phase is, as shown in FIG. 11, composed of a pair of claw pole type stator iron cores $31a_1$, $31b_1$, that face each other and are shifted at a predetermined angle, a pair of magnetic rings $32a_1$, $32b_1$, that are arranged around outer circumference of claw poles CP1, CP1' formed around inner circumferences of the cores $31a_1$, $31b_1$, and a toroidal coil $33b_1$ wounded on a bobbin $33a_1$ located at the center of the rotor unit $3S_1$. The magnetic ring $32a_1$ is engaged to of the stator iron core $31a_1$ such that one end face of the magnetic ring $32a_1$ contacts with the bottom disc portion of the stator iron core $31a_1$.

In the same manner, the stator unit $3S_2$ of the second phase consists of a pair of claw pole type stator iron cores $31a_2$, $31b_2$, a pair of magnetic rings $32a_2$, $32b_2$ that are arranged around outer circumference of claw poles CP2, CP2' formed around inner circumferences of the cores $31a_2$, $31b_2$, and a toroidal coil $33b_2$ wounded on a bobbin $33a_2$ located at the center of the rotor unit $3S_2$.

A rotor can be constructed as the same as the rotor 1R of FIG. 1 or the rotor 3R of FIG. 5, for example.

The structural characteristics of this improved construction are that the magnetic rings $32a_1$, $32b_1$ closely contact with the outside circumferences of the claw poles CP1, CP1' of the stator iron cores $31a_1$, $31b_1$ in the stator unit $3S_1$ of the first phase, and the magnetic rings $32a_2$, $32b_2$ closely contact with the outside circumferences of the claw poles CP2, CP2' of the stator iron cores $31a_2$, $31b_2$ in the stator unit $3S_2$ of the second phase. With this construction, each of the magnetic rings functions as a back yoke, which prevents the claw pole from saturating a magnetic flux.

That is, since the magnetic ring enlarges a magnetic path, a magnetic flux does not saturate at the claw poles even if the applied voltage to the coil exceeds saturation level for a stator unit that does not have a magnetic rings. Therefore, the presence of the magnetic ring solves the problem of saturation of a magnetic flux, which increases the strength of the claw poles and torque. Further, it is cheep to produce the stator of FIG. 11, while keeping the same magnetic performance as the stator of FIG. 1.

While the stator unit of FIG. 11 employs the independent magnetic rings that are closely contact with the outer circumference of the claw poles, a magnetic ring having function of yoke may be closely connected with an inner circumference of claw poles of the rotor, or a yoke portion may be integral with the stator or rotor instead.

As described above, the resolution of the stepping motor to which the inventions defined in claims 1 through 8 are applied becomes about four-times higher than that of a conventional PM-type stepping motor that employs a bobbin to wind a coil when the sizes of them are identical. For example, the resolution (step angle) of the PM-type motor of 40 mm in diameter is 7.5 degrees, while the resolution of the motor of the present invention can be 1.8 degrees.

Therefore, since the stepping motor of the present invention is compact, high in torque, high in the resolution and cheep, it can be applied to a printer, particularly, to an actuator to carry a printing head or to feed sheet in a compact ink-jet printer.

An image quality of a printer becomes higher as resolution increases. For instance, the resolution of 2400 DPI (dot per inch) enables higher image quality than the resolution of 600 DPI. The resolution of the printer depends on the resolution of the stepping motor. However, a conventional PM-type motor is restricted in the resolution due to the construction thereof. On the other hand, since the ratio of effective magnetic flux is about 50% in the HB-type stepping motor as described above, it is difficult to downsize the motor.

The present invention achieves both of the high resolution and the downsizing. Therefore, a stepping motor of the present invention will become the optimum actuator to carry a printing head or to feed sheet in a compact ink-jet printer.

Further, as shown in FIGS. 1, 4 and 5, the toroidal coil of the P-phase electric rotating machine is wound on the bobbin, and the bobbin is housed in the stator iron cores with compact construction. This is described in claim 10.

Still further, while the P-phase electric rotating machines of the above described embodiments are inner-rotor type motors, the present invention can be applied to an outer-rotor type motor where a rotor is arranged to surround the stator instead. This is described in claim 13.

Figure 12:
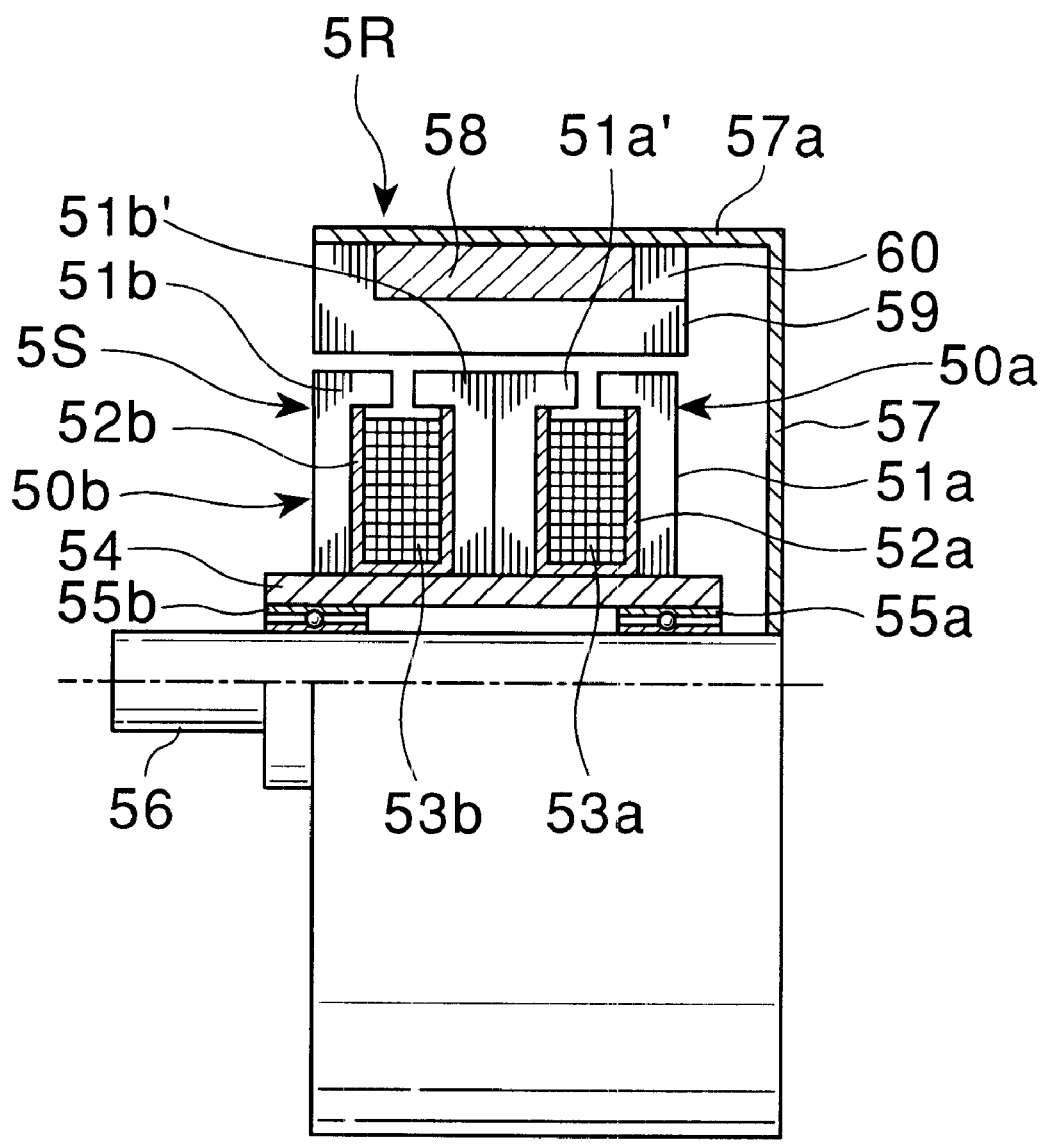
FIG.12 is a partly-sectioned vertical side view of an outer rotor construction according to the present invention.

One example of the outer-rotor type motor to which the present invention is applied is shown in FIG. 12.

FIG. 12 shows a two-phase outer-rotor type stepping motor construction according to the present invention that is a modified construction of the two-phase inner-rotor type stepping motor of the first embodiment shown in FIG. 1. In FIG. 12, the reference symbols 50a and 50b represent stator units of first and second phases, respectively.

The stator unit 50a consists of a pair of stator iron cores 51a, 51a', a coil bobbin 52a that gets caught between the stator iron cores 51a, 51a', and a coil 53a wound on the coil bobbin 52a. In the same manner, the stator unit 50b consists of a pair of stator iron cores 51b, 51b', a coil bobbin 52b and a coil 53b'. Each of the stator iron cores 51a, 51a', 51b and 51b' is provided with stator teeth around the outer circumference thereof.

The above described stator units 50a, 50b are fixed on a stator body 54 to constitute a stator 5S. The stator 5S is supported by a rotating shaft 56 though bearings 55a and 55b.

On the other hand, an outer-rotor type rotor 5R is composed of a cup-like rotor holder 57 that is connected to the rotating shaft, a permanent mag net 58 that is arranged inside the cylindrical surface of the rotor holder 57, a pair of rotor magnetic bodies 59, 60 that are alternatively arranged in the rotating direction to cover the permanent magnet 58. The inner circumferences of the rotor magnetic bodies 59, 60 face the outer circumference of the stator iron cores 51a, 51a′, 51b and 51b′ with a predetermined air gap.

As is the case with the first embodiment, the number of the stator teeth of the respective stator iron cores 51a, 51a′, 51b and 51b′ is Nr, and the stator teeth of each stator unit are shifted by ½ of the pitch Ps. The constructions of the rotor magnetic bodies are also similar to the first embodiment.

Functions of the Invention

According to the above described construction of the P-phase electric rotating machine having toroidal coils of the present invention, the problems of the prior art can be solved as follows.

Figure 14:
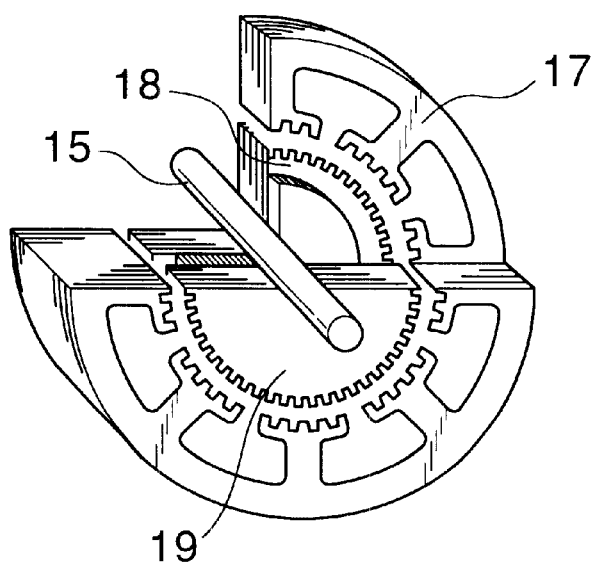
FIG. 14 is a perspective view of a stepping motor of the second prior art.
Figure 15:
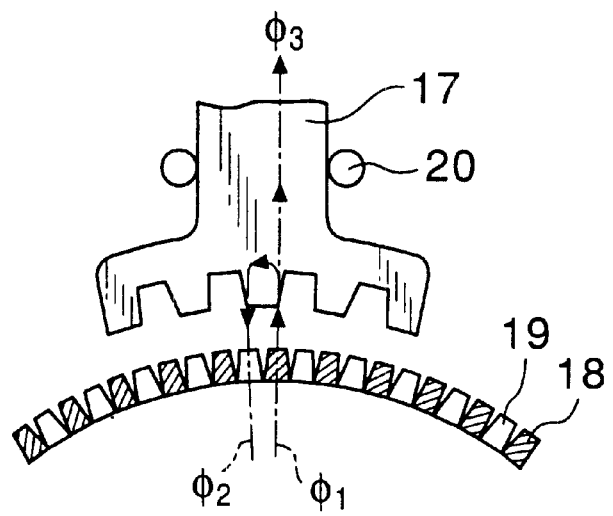
FIG. 15 is a front view of a principle portion of the stepping motor of FIG. 14 for explaining an operation thereof.

That is, while the magnetic poles or the rotor teeth of the conventional rotor are arranged around the rotor at equal pitch over circumference as shown in FIGS. 13 and 14, the pitch of rotor teeth of the rotor of the present invention varies at points of 2k in number in circumference. With this construction of the present invention, since the rotor can be made by laminating silicon steel plates or by sintering magnetic powder, the rotor has the same resolution as a conventional HB-type stepping motor at lower cost. Further, the toroidal coil can be wound on the bobbin and the stator teeth can be made by laminating magnetic plates or silicon steel plates that are formed by stamping process, the stator has the same resolution as a conventional HB-type stepping motor at lower cost. As a result, a high-resolution electric rotating machine can be constructed at low cost.

Still further, according to the invention, since most of the magnetic flux generated from the rotor can be used as effective magnetic flux interlinkage with the coil, the motor of the invention has higher torque than a conventional HB-type stepping motor having the same size, or the motor of the invention becomes more compact than the conventional HB-type stepping motor having the same torque.

Yet further, when the magnetic rings are arranged behind claw poles as the invention, since a magnetic flux does not saturate at the root of the claw pole, which produces high torque.

Effects of the Invention

The above construction of the stepping motor as the P-phase electric rotating machine having toroidal coil according to the present invention produces excellent effects as follows.

1. The basic construction described in the claimed invention produces the following effects:
   (1) The motor of the invention has the same resolution as a conventional HB-type stepping motor.
   (2) Since most of the magnetic flux generated from the rotor can be used as effective magnetic flux interlinkage with the coil, the motor of the invention has higher torque than a conventional HB-type stepping motor having the same size.
   (3) Since the number of the stator teeth can be freely selected and the stator teeth can be arranged around the entire circumference, there is a high flexibility in the step angle as compared with a conventional HB-type stepping motor in which the stator teeth are arranged on the stator poles only.

2. According to the construction of the second and third embodiments, since the rotor units and the stator units face each other, respectively, the rotor is less prone to saturation of a magnetic flux as compared with the construction of the first embodiment, which results good performance.

3. According to another construction, the stator teeth of the stator iron cores overhang the inner circumference of the toroidal coils, which produces an advantage of high torque.

4. Yet another construction is advantageous to reduce cogging torque.

5. When the pitch of the stator teeth is substantially equal to the pitch of the rotor teeth on the side arm, since the rotor teeth cannot be formed at the boundaries of the side arms, the total number Nr of the rotor teeth can be smaller than or equal to (Ns–k).

6. In the simplest practical construction since the number of the stator teeth can be freely selected, there is a high flexibility in the step angle as compared with a conventional HB-type stepping motor.

7. According to the construction, since each of the plates, which are laminated to constitute the rotor magnetic bodies, is one-piece construction, the plate does not fall apart, which increases efficiencies of the stamping process and the laminating process.

8. According to the construction, since the toroidal coil is wound on the bobbin, the coil becomes compact and the winding process becomes easy with low cost as compare with a conventional HB-type stepping motor.

9. According to the construction, an operational stepping motor, which has the function of the basic construction of the invention, can be obtained by the combination of the rotor of the invention and a conventional claw pole stator.

10. When the yoke portion, which is closely connected with the outer circumference of the claw poles of the stator or the inner circumference of the claw poles of the rotor, is arranged being independent from or integral with the stator or rotor, since the yoke portion enlarges a magnetic path, a magnetic flux does not saturate even if the applied voltage to the coil exceeds saturation level for a stator or rotor that does not have a yoke portion. This increases the strength of the claw poles and torque.

11. When the outer-rotor construction is adapted, the above described functions of the invention are achieved in the outer-rotor electric rotating machine.

12. When the stepping motor of the invention is applied to an actuator of a printer, it becomes the optimum actuator to carry a printing head or to feed sheet in a compact ink-jet printer.

What is claimed is:

1. A multi-phase electric rotating machine having toroidal coils, comprising:

a stator including a number P of stator units (P is integer satisfying P≧2) each of which is formed of a pair of stator iron cores made from magnetic material and a toroidal coil disposed between said pair of stator iron cores, each of said stator iron cores being provided with a number Ns of stator teeth formed around an inner circumference at equal pitch Ps, said pair of stator iron cores of said each stator unit being arranged such that said stator teeth are shifted to each other by ½ of the pitch Ps, and said number P of stator units being concentrically connected to be arranged in a direction of a rotating shaft such that said stator teeth of said stator units are shifted to one another by ½P of the pitch Ps; and a rotor that faces said stator with a predetermined air gap and is rotatable, said rotor consisting of at least one rotor unit that has a permanent magnet and Nr number of rotor teeth made from magnetic material arranged around said permanent magnet in the rotating direction of said rotor, said rotor teeth consisting of k pairs of N (north) polar rotor teeth groups and k pairs of S (south) polar rotor teeth groups (K is integer satisfying k≧1), wherein each of the rotor teeth is extended substantially the entire length of said rotor arranged in said rotating direction, said each N polar rotor teeth group consisting of a number (Nr/2k) of N rotor teeth that are adjacently arranged in the rotating direction, and said each S polar rotor teeth group consisting of the number (Nr/2k) of S rotor teeth that are adjacently arranged in the rotating direction.

2. The multi-phase electric rotating machine having toroidal coils according to claim 1, wherein said rotor comprises the number P of independent rotor units that correspond to and face said stator units, respectively.

3. The multi-phase electric rotating machine having toroidal coils according to claim 2, wherein said number P of stator units are arranged such that said stator teeth of said stator units are coincident with one another instead of shifting, and wherein said number P of rotor units are arranged such that said rotor teeth of said rotor units are shifted to one another by ½P of the pitch Ps.

4. A multi-phase electric rotating machine having toroidal coils, comprising:

a number P of independent stator units (P is integer satisfying P≧2) each of which is formed of a pair of stator iron cores made from magnetic material and a toroidal coil disposed between said pair of stator iron cores, each of said stator iron cores being provided with a number Ns of stator teeth formed around an inner circumference at equal pitch Ps, said pair of stator iron cores of said each stator unit being arranged such that said stator teeth are shifted to each other by ½ of the pitch Ps, and said stator units being arranged in a direction of a rotating shaft; and the number P of independent rotor units that face said stator units with a predetermined air gap, respectively, and are rotatable, said rotor unit having a permanent magnet and rotor teeth of Nr in the total number made from magnetic material arranged around said permanent magnet in the rotating direction of said rotor, said rotor teeth consisting of k pairs of N (north) polar rotor teeth groups and k pairs of S (south) polar rotor teeth groups (K is integer satisfying k≧1, arranged in said rotating direction, said each N polar teeth group consisting of a number (Nr/2k) of rotor teeth that are continuously arranged in the rotating direction, and said each S polar rotor teeth group consisting of the number (Nr/2k) of rotor teeth that are continuously arranged in the rotating direction, wherein when one phase of said toroidal coils of said stator units is excited and the corresponding rotor unit is attracted and aligned, said stator teeth of said stator unit of the next phase is shifted from said rotor teeth of the corresponding rotor by ½P of the pitch Ps.

5. The multi-phase electric rotating machine having toroidal coils according to one of claims 1 through 4, wherein said stator teeth of said stator units overhang the inner circumference of said toroidal coils.

6. The multi-phase electric rotating machine having toroidal coils according to one of claims 1 through 4, wherein the average center line of said N polar rotor teeth group forms (360(n±½)/Ns) degrees (n is integer satisfying n≧1) with respect to the average center line of said S polar rotor teeth group.

7. The multi-phase electric rotating machine having toroidal coils according to one of claims 1 through 4, wherein Nr is smaller than Ns.

8. The multi-phase electric rotating machine having toroidal coils according to claim 6, wherein P, k and Ns satisfy the conditions P=2, k=2 and Ns=4n±2.

9. The multi-phase electric rotating machine having toroidal coils according to one of claims 1 through 4, wherein rotor magnetic bodies of the different polar rotor teeth groups are alternatively arranged around said rotor, and wherein the boundaries among said different polar rotor teeth groups are connected to form a one-piece iron core at least when it is laminated.

10. The multi-phase electric rotating machine having toroidal coils according to one of claims 1 through 4, wherein said stator unit is provided with a bobbin on which said toroidal coil is wound, and wherein said bobbin is disposed between said pair of stator iron cores.

11. The multi-phase electric rotating machine having toroidal coils according to one of claims 1 through 4, wherein said stator teeth or said rotor teeth are formed as claw poles by die-cutting a magnetic steel plate.

12. The multi-phase electric rotating machine having toroidal coils according to claim 11, further comprising a yoke portion made from magnetic material, said yoke portion is closely connected with the outer circumference of said claw poles of said stator or the inner circumference of said claw poles of said rotor, and wherein said yoke portion is independent from or integral with said stator or rotor.

13. The multi-phase electric rotating machine having toroidal coils according to one of claims 1 through 4, wherein said rotor is arranged to surround said stator as an outer rotor construction, and wherein said stator teeth are formed around outer circumference instead of said inner circumference, and said rotor teeth are formed around inner circumference of said permanent magnet instead of said outer circumference.

14. A method of operating an ink jet printer comprising:

providing the multi-phase electric rotating machine having toroidal coils according to one of claims 1 through 4, to perform at least one of driving a print head and feeding a sheet of paper in the ink jet printer.

* * * * *